(12) United States Patent
Fraser (10) Patent No.: US 7,017,920 B2
(45) Date of Patent: Mar. 28, 2006

(54) SHOPPING TROLLEY

(76) Inventor: Mark Andrew Fraser, C/- Fraser Group, Level 17, 240 Queen Street, Brisbane, QLD 4000 (AU)

( * ) Notice: Subject to any disclaimer, the term of this patent is extended or adjusted under 35 U.S.C. 154(b) by 0 days.

(21) Appl. No.: 10/496,564

(22) PCT Filed: Nov. 20, 2002

(86) PCT No.: PCT/AU02/01571

§ 371 (c)(1),
(2), (4) Date: May 24, 2004

(87) PCT Pub. No.: WO03/043866

PCT Pub. Date: May 30, 2003

(65) Prior Publication Data

US 2004/0262864 A1 Dec. 30, 2004

(30) Foreign Application Priority Data

Nov. 23, 2001 (AU) .................................. PR9045
Apr. 16, 2002 (AU) .................................. PS1760

(51) Int. Cl.
*B62B 3/00* (2006.01)

(52) U.S. Cl. .......................... 280/33.992; 280/33.996; 280/33.991

(58) Field of Classification Search ........... 280/33.991, 280/33.992, 33.993, 33.994, 33.995, 33.996, 280/33.997, 33.998, 639, DIG. 4, 47.34, 280/651; 297/256.17

See application file for complete search history.

(56) References Cited

U.S. PATENT DOCUMENTS

| | | | | |
|---|---|---|---|---|
| 3,157,871 A | * | 11/1964 | Umanoff | 280/33.992 |
| 5,255,930 A | * | 10/1993 | Jones et al. | 280/33.992 |
| 5,505,472 A | | 4/1996 | Trubiano | |
| 5,961,133 A | | 10/1999 | Perry | |
| 6,354,612 B1 | * | 3/2002 | Adamson | 280/33.992 |
| 6,406,250 B1 | * | 6/2002 | Jaeger et al. | 280/DIG. 4 |
| 6,488,292 B1 | * | 12/2002 | O'Quin | 280/33.991 |
| 6,761,364 B1 | * | 7/2004 | Murar et al. | 280/33.991 |
| 6,805,365 B1 | * | 10/2004 | Lantz | 280/33.991 |

FOREIGN PATENT DOCUMENTS

DE 4203330 8/1993

\* cited by examiner

*Primary Examiner*—Hau Phan
(74) *Attorney, Agent, or Firm*—Stites & Harbison; Douglas E. Jackson (57) ABSTRACT

A shopping trolley (10) has a basket (11), handle (12) and front and rear wheels (13, 14). The basket (11), tapered in plan view, has side walls (15, 16) interconnected by a front wall (17). The rear wall (19) is hingedly connected to the side walls (15, 16) and engages the rearward end of the floor (22), which is hingedly connected to the side walls (15, 16) or front wall (17). The floor (22) is downwardly inclined from the rearward end to the forward end. When the trolley (10) is nested with a similar trolley, the rear wall (19) is swung inwardly and upwardly, causing the floor (22) to be swung upwardly to be behind the front wall (17). Alternative the floor (22) may be folded e.g. in a concertina-like fashion, to be behind the front wall (17).

14 Claims, 8 Drawing Sheets

SHOPPING TROLLEY

BACKGROUND OF THE INVENTION

1. Field of the Invention

THIS INVENTION relates to a shopping trolley.

The invention particularly relates, but is not limited to, a shopping trolley designed to be nested with similar trolleys when not in use.

2. Prior Art

Current shopping trolleys have a number of defects. Examples of the current defects are:

a) they are hard to steer, push and control—one only needs to observe elderly, and even young, people using existing trolleys to see this, either laden or unladen;

b) they damage vehicles and shopping centres;

c) the current design allows children to stand on the base wheel frame and hang off the sides, making the trolleys unstable and dangerous;

d) they are noisy—a function of their construction from metal and of current wheel design that promotes "shudder";

e) no shelves or different levels or hooks upon which a shopper can place food items susceptible to damage from being squashed by other items subsequently placed in the trolley or from children riding in the trolley are provided; and f) they have limited means for attaching advertising to the trolley and have limited surface area to provide effective advertising upon.

Attempts have been made to minimise the defects by using new types of construction, including trolleys having baskets moulded of plastics materials. Examples are disclosed in U.S. Pat. No. 5,613,696 (De LUNA) and U.S. D 444,281 S (GAZE et al).

While these shopping trolleys have reduced or ameliorated some of the defects, they have not provided a successful answer.

SUMMARY OF THE PRESENT INVENTION

It is an object of the present invention to provide a shopping trolley which eliminates, or least ameliorates, the defects in the known trolleys.

It is a preferred object to provide a trolley which can be nested with similar trolleys, when not in use, in a minimum space.

It is a further preferred object to provide a trolley which maximises the area available for advertising.

It is a still further preferred object to provide a trolley which cannot be stood on by children to make the trolley unstable.

It is a still further preferred object to provide a trolley which eliminates a separate frame.

Other preferred objects will become apparent from the following description.

In one aspect, the present invention resides in a shopping trolley basket, including:

a floor, hingedly connected to a front wall and/or side walls, at or adjacent a forward end of the floor, a rearward end of the floor being supported by a rear wall and the floor being substantially horizontal or downwardly inclined from a rearward end to a forward end, so arranged that:

as a trolley provided with the basket is nested with a similar trolley, the rear wall is swung inwardly and upwardly to cause the floor to be swung upwardly to lie behind the front wall.

Preferably, the floor has a hinge member to define a distal floor portion operable to overlie the basket of the similar trolley nested within the trolley.

In one alternative embodiment, the floor has a front portion hingedly connected to the front wall and/or side walls, and a second hinge member connecting a rear portion of the floor to the front portion.

In a second aspect, the present invention resides in a shopping trolley, including:

a basket, to receive articles, having a front wall interconnecting a pair of side walls;

handle means at or adjacent a rear of the basket; and wheel means supporting the basket, wherein:

the basket has a rear wall, preferably inclined to the vertical, operably hingedly connected to the side walls at or adjacent an upper end of the rear wall; and a floor, having first and second side floor portions operably hingedly connected to respective side walls, the floor being substantially horizontal or downwardly inclined from a rearward end to a forward end, so arranged that:

as the trolley is nested with a similar trolley, the rear wall is swung inwardly and upwardly to cause the first and second side floor portions to swing upwardly to lie adjacent the respective side walls.

In a third aspect, the present invention resides in a shopping trolley, including:

a basket, to receive articles, having a front wall interconnecting a pair of side walls;

handle means at or adjacent a rear of the basket; and wheel means supporting the basket, wherein:

the basket has a rear wall, preferably inclined to the vertical, operably hingedly connected to the side walls at or adjacent an upper end of the rear wall; and a floor, having first and second side floor portions operably hingedly connected to respective side walls and a central floor portion connected to the front wall and having a plurality of hingedly connected floor panels, the floor being substantially horizontal or downwardly inclined from a rearward end to a front wall end; so arranged that:

as the trolley is nested with a similar trolley, the rear wall is swung inwardly and upwardly to cause the first and second side floor portions to swing upwardly to lie adjacent the respective side walls and the floor panels of the central floor portion to fold in a concertina-like fashion to a position adjacent the front wall.

Preferably, the side floor portions support side edges of the floor panels of the central floor portion when the trolley is in use.

In a fourth aspect, the present invention resides in a shopping trolley, including;

a basket, to receive articles, having a front wall interconnecting a pair of side walls;

handle means at or adjacent a rear of the basket; and wheel means supporting the basket, wherein:

the basket has a rear wall, preferably inclined to the vertical, operably hingedly connected to side walls at or adjacent an upper end of the rear wall; and a floor, having a plurality of floor panels or sections hingedly interconnected to each other, (preferably) extending transversely to the basket, and (preferably) connected at a rearward end to the rear wall, the floor being substantially horizontal or downwardly inclined from the rearward end to a forward end, so arranged that:

as the trolley is nested with a similar trolley, the rear wall is swung inwardly and upwardly to cause the floor to be swung upwardly to lie behind the front wall, where the floor panels of floor sections are hingedly movable to accommodate a change in angular relationship between the rear wall and the front wall.

Preferably, the floor is hingedly connected to the front wall and, preferably, the ends of the floor panels or floor sections are supported by guides or supports along the side walls.

In a fifth aspect, the present invention resides in a shopping trolley, including:

a basket, to receive articles, having a front wall interconnecting a pair of side walls;

handle means at or adjacent a rear of the basket; and wheel means supporting the basket, wherein:

the basket has a rear wall, preferably inclined to the vertical, operably hingedly connected to side walls at or adjacent an upper end of the rear wall; and a floor incorporating at least one panel of flexible fabric or mesh material connected to or adjacent a front wall and to the rear wall, side edges of the floor being supportable by guides on the side walls, the floor being substantially horizontal or downwardly inclined from a rearward end to a forward end, so arranged that, as the trolley is nested, the rear wall is swung inwardly and upwardly to cause the flexible fabric or mesh of the floor to be at least partially folded and/or swung upwardly to lie behind the front wall.

In respective alterative embodiments, the handle means of the first to fifth aspects may be omitted.

Preferably, stops or blocks on the side walls engage, and support, the rear wall and the floor when the trolley is in use.

Preferably, the side and front walls are formed of plastics material and may be injection moulded with an optional foam core or integral steel (or aluminium) tubular frame.

Preferably, the rear wall and floor are of similar construction.

Preferably, the side walls are concave in plan view and are inwardly tapered towards the front wall in plan view.

Preferably, a pair of rear wheels, which may be fixed or steerable, are provided on axles supported on downwardly directed legs or extensions at the rear of the side walls.

While the trolley may have a pair of front wheels, it is preferred to have a single steerable, eg., castor front wheel.

Preferably, the handle means interconnects extensions at the upper rear ends of the side walls and may be provided with shopping bag hanging means.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figure 1:
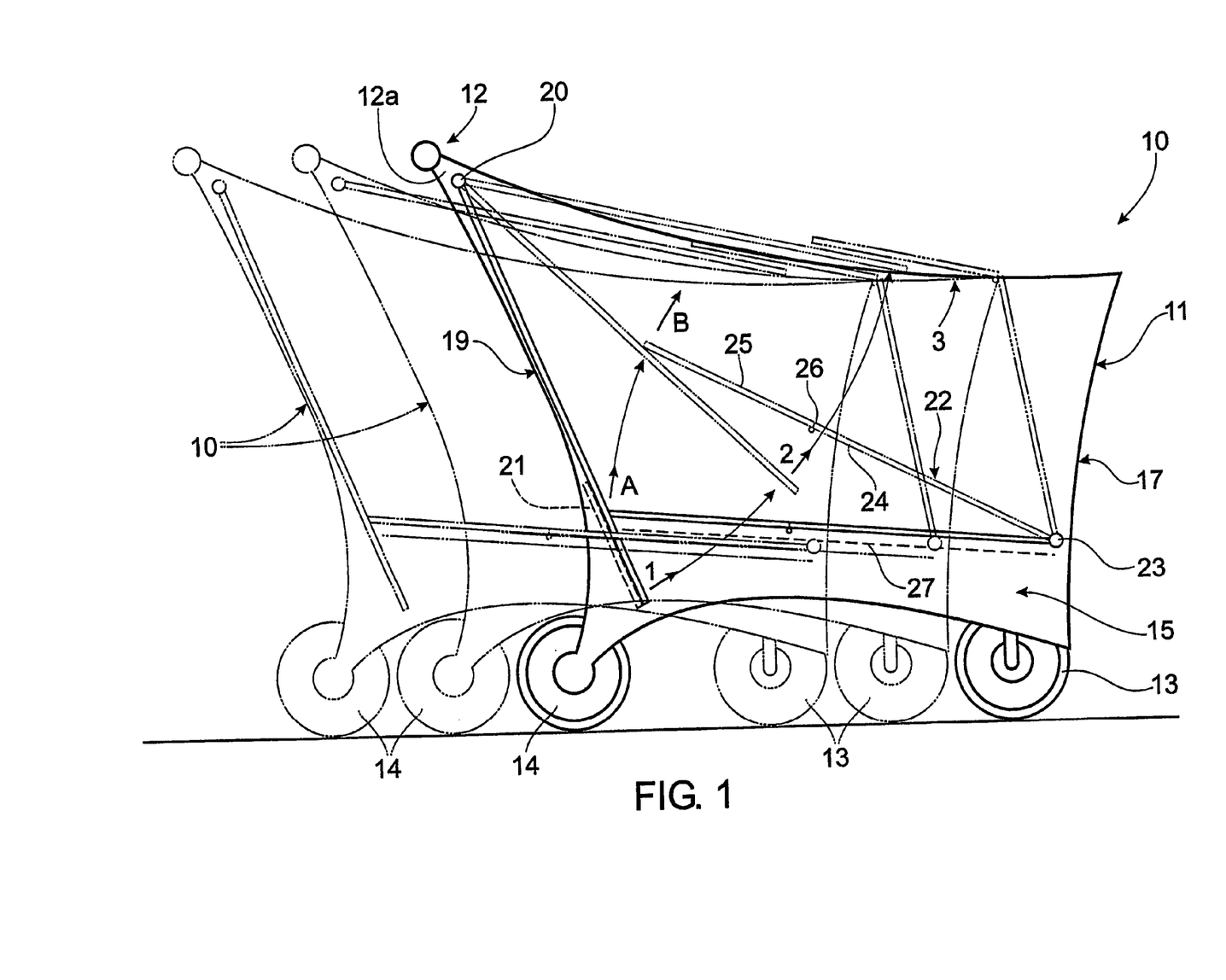
FIG. 1 is a schematic sectional side view of a first embodiment of the trolley.
Figures 2, 4:
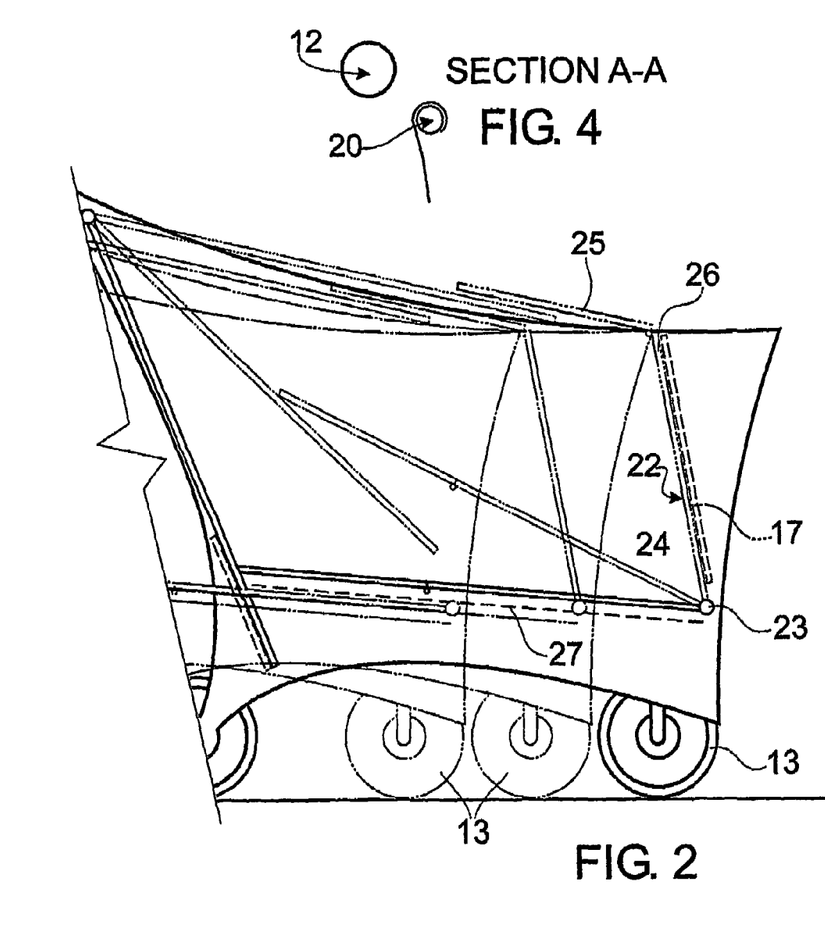
FIG. 2 is a similar view of the front part of the trolley.
FIG. 4 is a sectional side view taken on section A—A in FIG. 3.
Figures 3, 5:
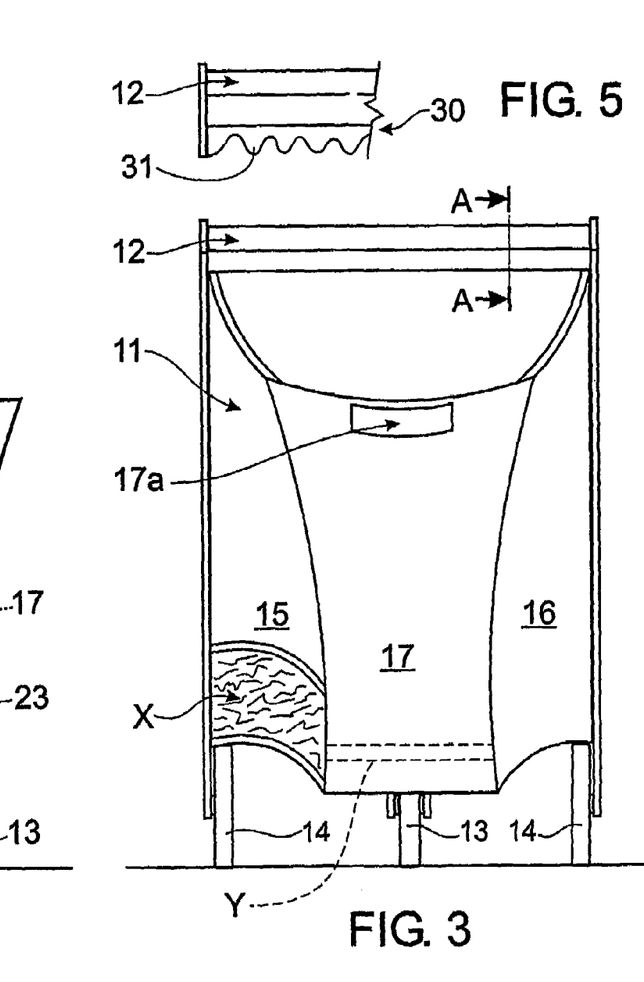
FIG. 3 is a front elevational view of the trolley.
FIG. 5 is a front view of the handle.

Referring to FIGS. 1, 2 and 3, the trolley 10 has a basket 11, handle 12, front and rear wheels 13 and 14, to be hereinafter described in more detail, and is arranged to be nested with a number of similar trolleys.

The basket 11, which is tapered towards its forward end, has a pair of side walls 15, 16 interconnected by a front wall 17, which may be provided with a pull handle 17a.

Preferably, the front and side walls 15, 16 and 17 are moulded integrally of plastics material, eg., PVC (which may be coloured), where the injection moulding may incorporate internal bracing (not shown) or the walls may be formed of a sandwich-like construction with an, eg., PVC skin/expanded plastics foam core/PVC skin construction.

NB: The selection of the specific plastics materials can be varied to suit the particular types of construction/colours.

It will be noted that the side walls 15, 16 are preferably concave in plan view and have low "skirts" which extend below the level of the top of the front wheel 13.

In an alternative embodiment, a metal (eg., aluminium or steel) tubular frame may be provided for the basket, enclosed by the side and front walls, where the "skirts" prevent children from being able to stand on the frame.

Preferably, the rear wheels 14 are non-steerable and are mounted on axles (not shown) supported by rearwardly/downwardly-extending extensions 18 at the lower rear end of the side walls 15 and 16.

While a pair of steerable front wheels may be provided, it is preferable to have a single steerable front wheel 13 provided with a castor-type support.

The rear wall 19 is hingedly mounted at its upper end 20 to the side walls 15, 16 and in normal use, is held in a position inclined to the vertical by a pair of stops or blocks 21 on the inner faces of the side walls 15, 16.

It will be noted that the handle 12 interconnects rearwardly extending extensions 12a at the rear upper ends of the side walls 15, 16, and bracing means (not shown) may interconnect the lower rear ends of the side walls 15, 16.

The floor 22 is hingedly connected to the side walls 15, 16 and/or the front wall 17 by hinge means 23 at the forward end of the floor 22. The floor has a main floor portion 25 interconnected to a rear distal floor portion 25 by a hinge member 26 which limits the hinged movement of the distal portion 25 relative to the main floor portion 24.

When the trolley is in use, the floor 22 is supported on guides or stops 27 on the inner faces of the side walls 15, 16 and the rear end of the floor 22 bears on the rear wall 19.

When a similar trolley is nested with the trolley 10, the rear wall 19 swings inwardly and upwardly about hinge 20 in the manner indicated by the arrows 1, 2 and 3 in FIG. 1. This causes the floor 22 to be swung upwardly in the direction indicated by the arrows A and B until the main floor portion 24 lies just behind the front wall 17. When the main floor portion 22 reaches the nearly-vertical position, the hinge member 26 allows the rear distal floor portion 25 to be hinged downwardly and overlie the adjacent portion of the rear wall 19.

When the nested trolley is removed, the action is reversed.

It will be noted that the floor 22 is downwardly-inclined from the rearward end to the forward end to enable the rear wall 19 to raise the floor 22 in the manner hereinbefore described.

This arrangement of the floor 22 is in contrast with existing trolleys, which always have the floor upwardly inclined from the rear wall towards the front wall.

The large surface areas of the outer faces of the side walls 15, 16 and the front wall 17 provide relatively large areas for the placement of advertising material Z (see FIGS. 7 and 8) and, as hereinbefore described, the walls may be coloured to match a corporate identity, eg., they may be coloured red with white writing for the display of the Registered "Coca-Cola" trade mark.

The handle 12 may be provided with a fixed, or removable, rack member 30 which may be provided with a series of hooks 31 from which plastic shopping bags may be suspended.

Figure 6:
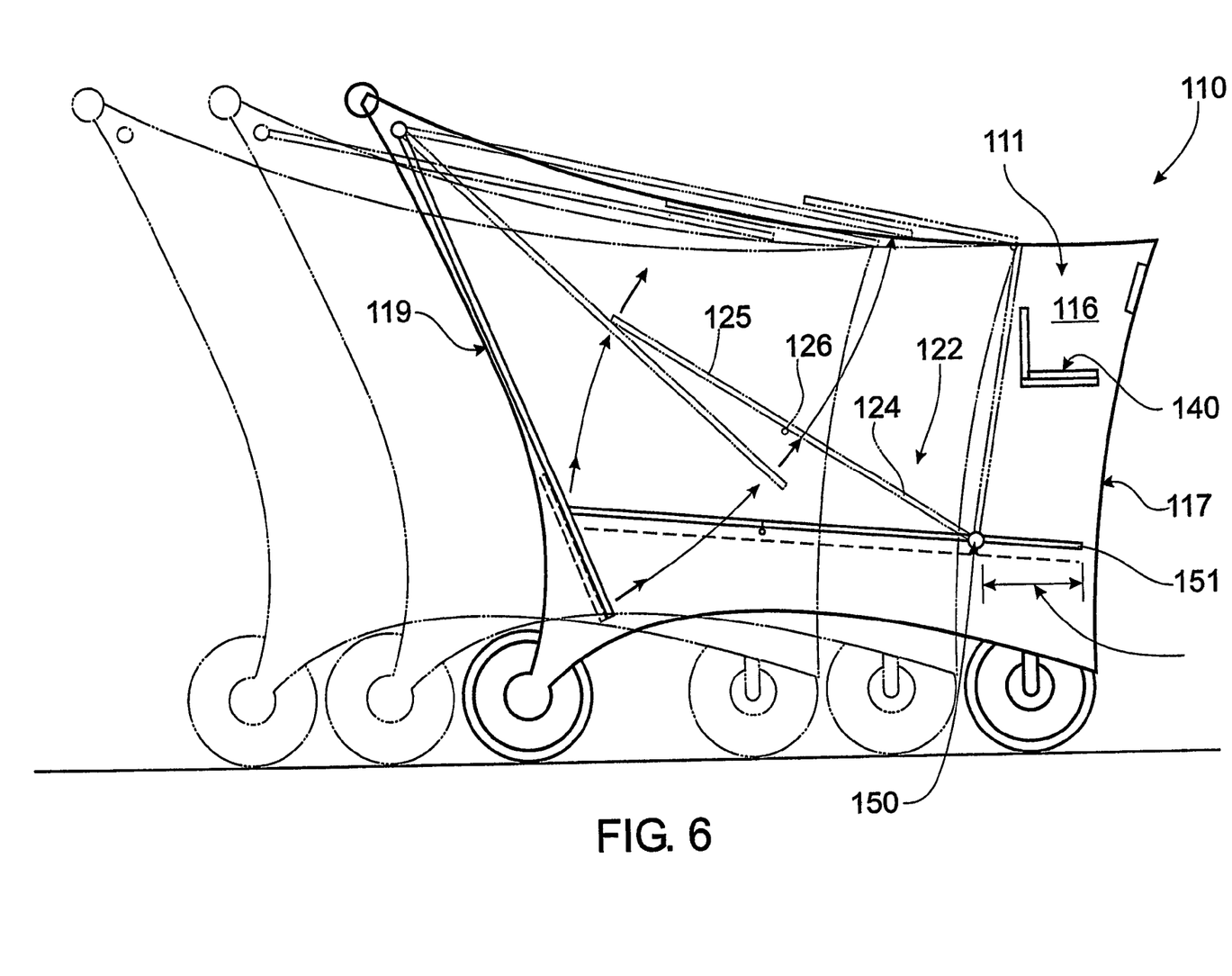
FIG. 6 is a schematic sectional side view of the second embodiment of the trolley.

Referring to the second embodiment of FIG. 6, a child seat 140 may be provided within the basket 111, behind the front wall 117 (and provide additional bracing between the side walls 115, 116).

To accommodate the provision of the seat 140, the floor 122 has a hinge member 150 interconnecting the main floor portion 124 to a fixed front floor portion 151 provided just rearwardly of the front wall 117. The operation of the rear wall 119 to raise the floor 122 is as hereinbefore described with reference to the embodiment of FIGS. 1 to 3.

Figure 7:
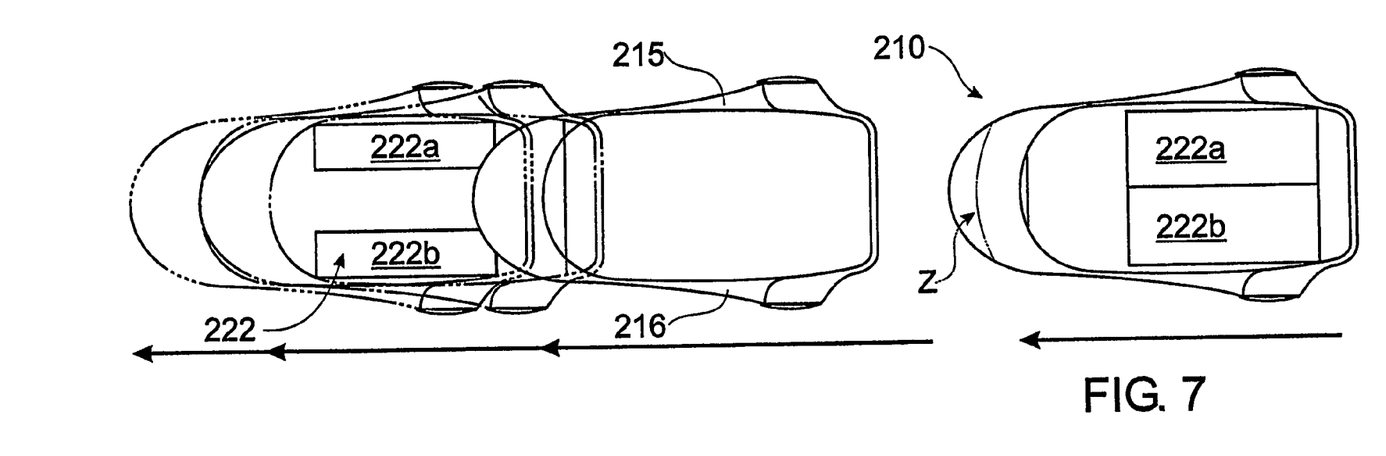
FIGS. 7 and 8 are respective top plan and schematic sectional side views of the third embodiment of the trolley.
Figure 8:
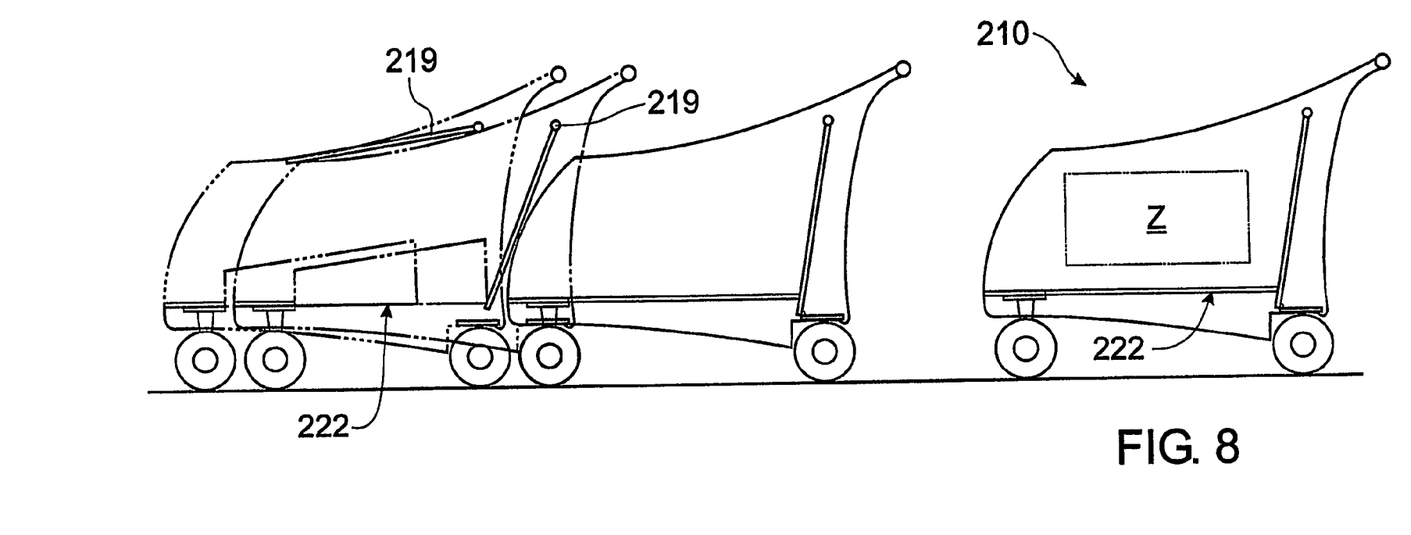

Referring to FIGS. 7 and 8, the trolley 210 of the third embodiment has a floor 222 formed by first and second side floor portions 222a and 222b which are hingedly connected to respective side walls 215, 216 and are so arranged that when the rear wall 219 is swung inwardly and upwardly as the trolley 210 is nested with a similar trolley, the side floor portions are moved from a substantially horizontal position (to support a load in the basket) to substantially vertical positions lying adjacent the respective side walls 215, 216.

Figure 9:
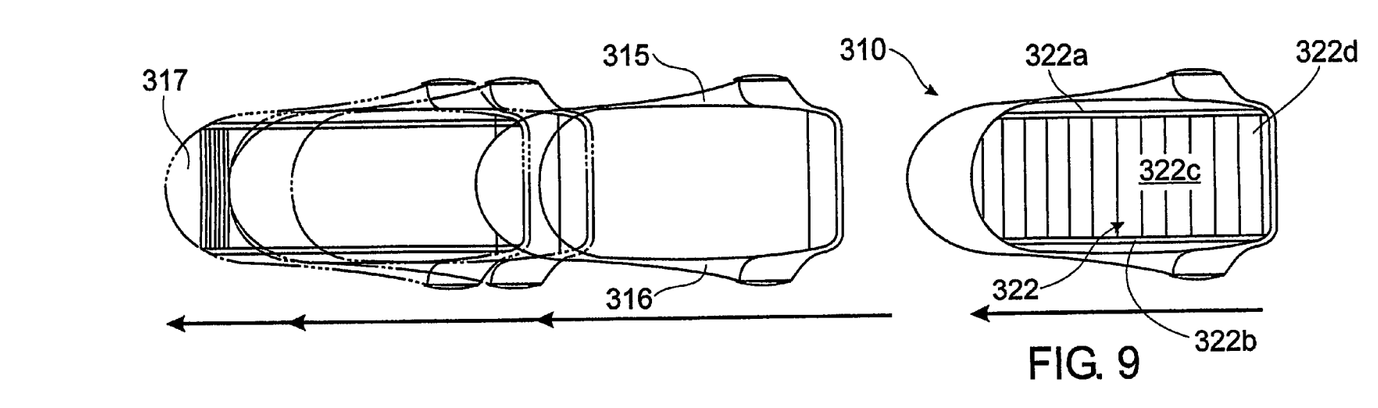
FIGS. 9 and 10 are similar views of a fourth embodiment of the trolley.
Figure 10:
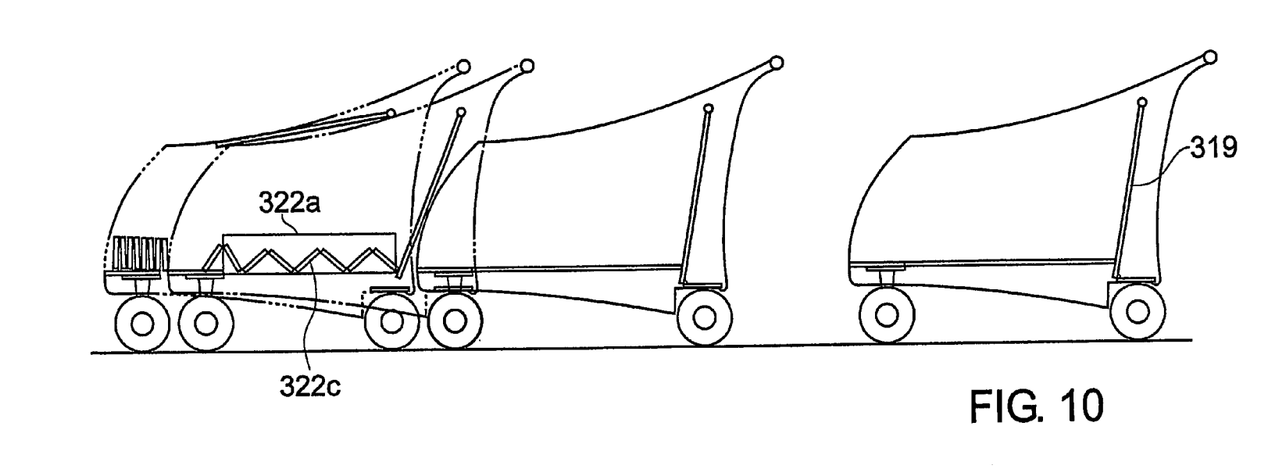

In the fourth embodiment of FIGS. 9 and 10 in the trolley 310, the floor 322 has first and second side floor portions 322a and 322b hingedly connected to the side walls 315, 316 and a central floor portion 322c having a plurality of hingedly connected floor panels 322d extending substantially transversely of the basket with the forward-most floor panel 322d being hingedly connected to the front wall and the rear-most floor panel 322d being hingedly connected the rear wall 319.

When the trolley 310 is nested with a similar trolley, and the rear wall 319 is swung inwardly and upwardly, the first and second side portions 322a and 322b are swung upwardly and outwardly to lie adjacent the side walls 315, 316 while the floor panels 322d of the central floor portion 322 fold in a concertina-like manner to lie rearwardly of the front wall 317.

Preferably, the side floor portions 322a, 322b are arranged to support the adjacent ends of the floor panels 322d when the floor 322 is in the operative position to support a load within the basket.

Figure 11:
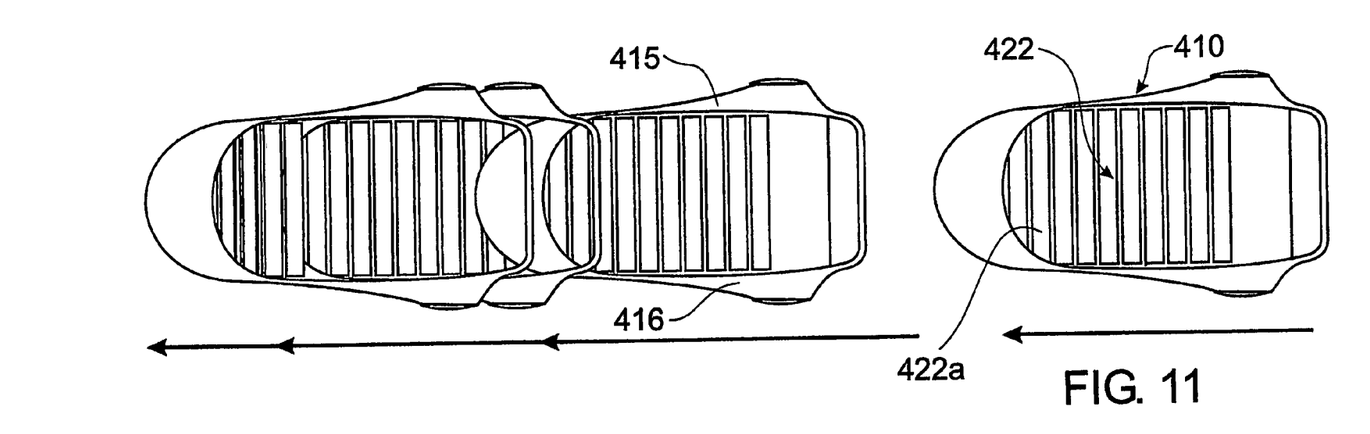
FIGS. 11 and 12 are similar views of a fifth embodiment of the trolley.
Figure 12:
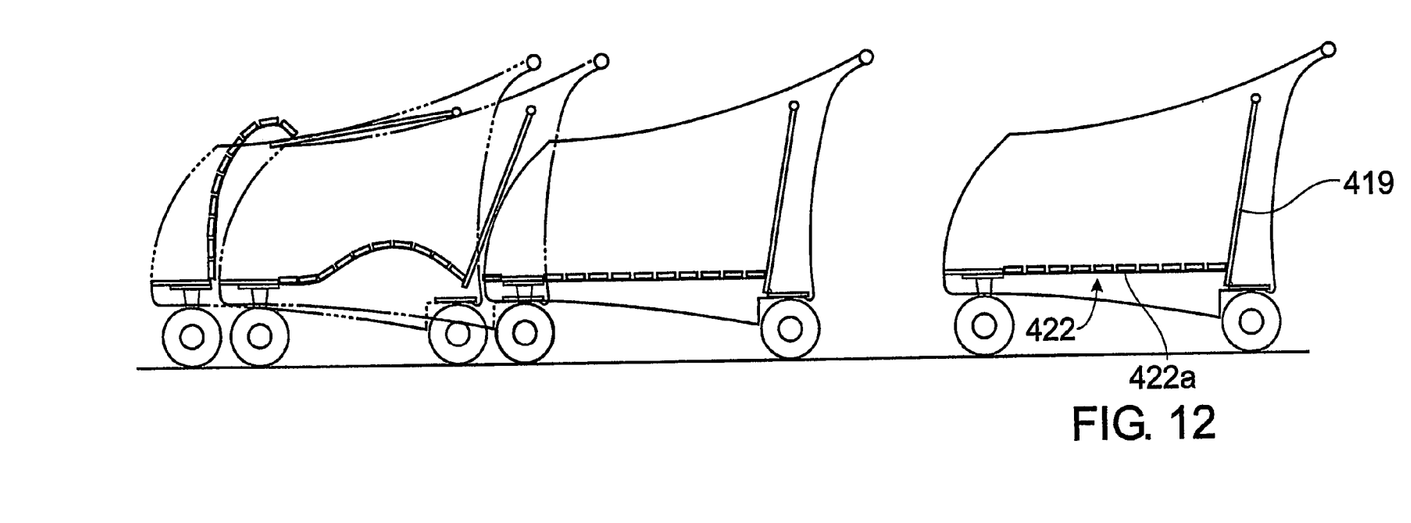

In the fifth embodiment of FIGS. 11 and 12, the floor 322 of the trolley 410 has a plurality of pivotally connected floor panels or floor sections 422a extending substantially transversely to the basket, where the foremost floor panel 322a is connected to the front wall (or to a rearward extension from the front wall) and the rearmost of the floor panels 422a is hingedly connected to the rear wall 419 with the ends of the floor panel 422a being supported by suitable guides extending along the side walls 415, 416.

As the trolley 410 is nested with a similar trolley, and the rear wall 419 is swung inwardly and upwardly, the floor panels 422a can hingedly move relative to each other to accommodate the change in angular relationship between the front wall and the rear wall 419 and adopt the intermediate and final positions indicated in FIG. 12.

Figure 13:
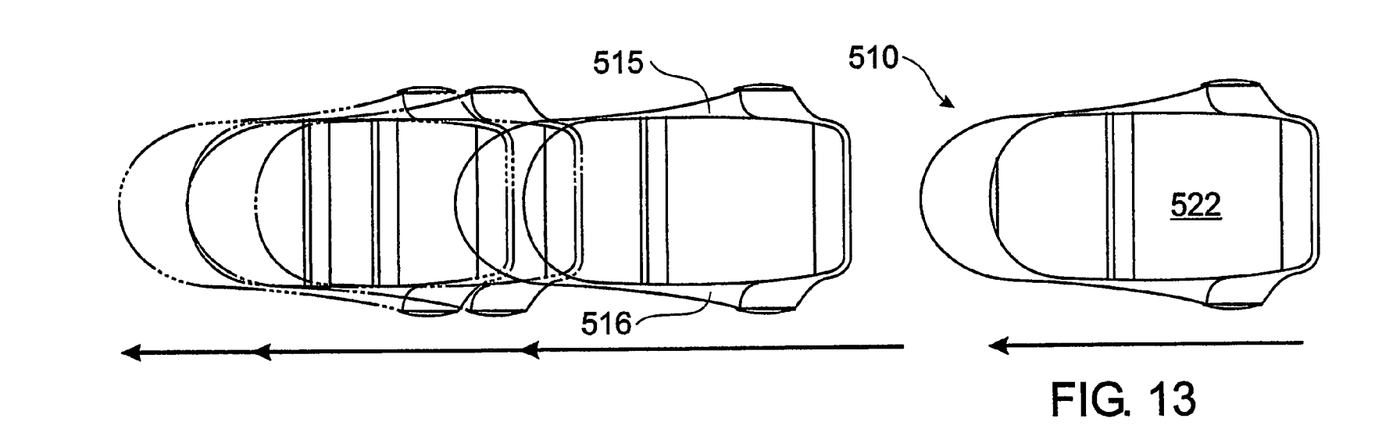
FIGS. 13 and 14 are similar view of a sixth embodiment of the trolley.
Figure 14:
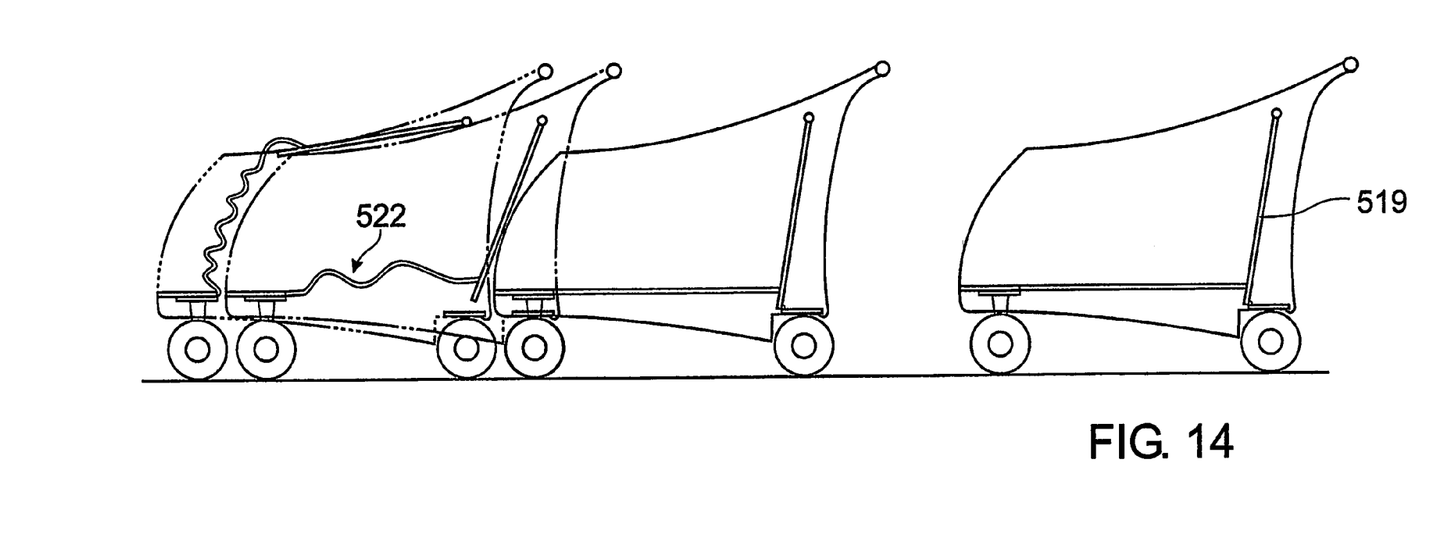

Finally, in the sixth embodiment of FIGS. 13 and 14, the trolley 510 has a floor 522 where the floor 522 has a panel of flexible fabric or mesh attached at its rearward end to the rear wall 519, the side edges of the floor 522 being supported by suitable guides extending along the side walls 515, 516 of the trolley. When the trolley 510 is nested with a similar trolley, and the rear wall 519 swings inwardly and upwardly, the flexible fabric or mesh of the floor 522 can flex and/or fold to adopt the "folded" configuration behind the front wall as illustrated in FIG. 14.

Figures 15, 16:
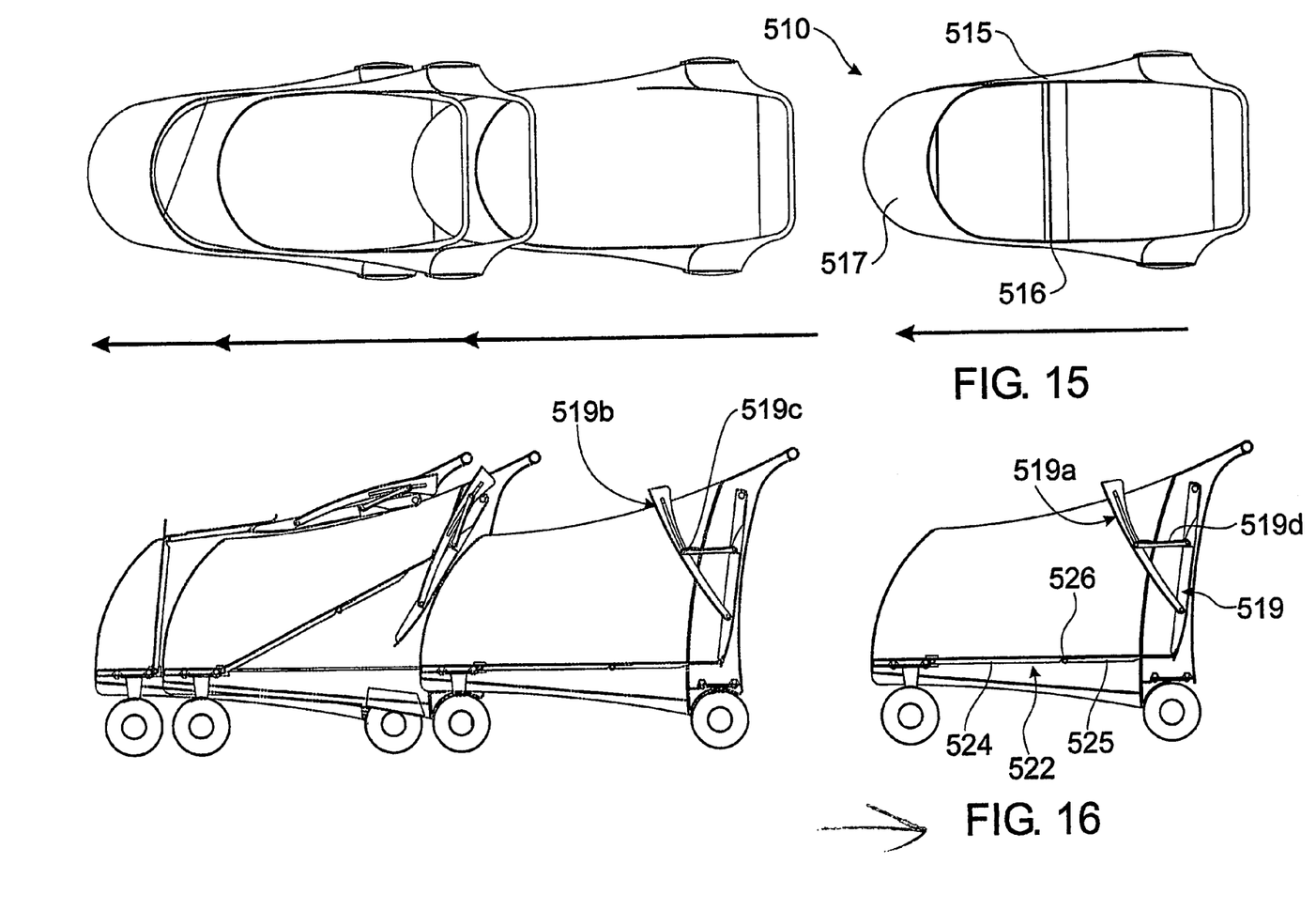
FIGS. 15 and 16 are similar views of a seventh embodiment of the trolley.

The trolley 610 of the seventh embodiment of FIGS. 15 and 16 has a floor 522 similar to the floor 122 of trolley 110 of the second embodiment of FIG. 6. The rear wall 519 is hingedly mounted on the side walls 515, 516. A pair of baskets 519a are hingedly connected to the side wall 519, at their lower ends, and have slots 519b which receive pins 519c on respective links 519d hingedly mounted on the side wall 519 intermediate its height.

As shown in FIG. 16, the rear wall is swung inwardly and upwardly to raise the floor 522 to a position where the hinge member 526 allows the rear distal floor portion 525 to lie substantially horizontal to the main floor portion 524 to lie behind the front wall 517.

Various advantages of the trolley, the subject of the present invention, include:

1) the hingedly mounted rear wall and foldable floor enables the trolleys to be readily nested;

2) those features further enable the side and front walls to have greater surface areas suitable for provision of advertising material;

3) the method of construction of the trolleys (which may include a "softer" outer plastic skin) minimises the risk of damage if they come into contact with cars, walls, supermarket fittings and the like, and the likelihood of corrosion is minimised;

4) the preferred tricycle design, having a steerable front wheel and fixed rear wheels enables larger wheels to be used and eliminates the wheel "shudder" encountered with known carts. (It is possible, in alternative embodiments, to have four wheels, where the rear pair of wheels may be steerable if preferred.);

5) the carts will be of relatively light weight without loss of strength, and may be able to float to make recovery from harbours and streams easier;

6) a shelf or ledge (or child seat) may be located within the basket, where children can sit/food items can be placed;

7) a brake or speed governor is provided over, or as part of, the handle or by one or more wheels activated either by hand or foot may be included to prevent the trolley rolling away when placed on an incline;

8) a tracking device, preferably concealed within the wall(s) may be included to enable the trolleys to be located when removed from shopping areas;

9) a grab handle may be provided at the front which, when combined with the lower height of the front wall, will make it easier for shoppers to pull the trolleys and load/unload them (especially at the checkout stage).

10) where the trolleys are provided with rear wheels which can pivot, then a lever may be provided unlocking the fixed position of the rear wheels, making them easier to move in nested groups.

Various other changes and modifications may be made to the embodiments described and illustrated without departing from the present invention defined in the claims.

What is claimed is:

1. A shopping trolley, including:
   a basket, to receive articles, having a front wall interconnecting a pair of side walls; and
   wheels supporting the basket, wherein:
   the basket has a rear wall, inclined to the vertical, operably hingedly connected to side walls at or adjacent an upper end of the rear wall; and
   a floor, having a plurality of floor panels or sections hingedly interconnected to each other, extending transversely to the basket, and connected at a rearward end to the rear wall, the floor being substantially horizontal or downwardly inclined from the rearward end to a forward end, so arranged that:
   as the trolley is nested with a similar trolley, the rear wall is swung inwardly and upwardly to cause the floor to be swung upwardly to lie behind the front wall, where the floor panels of floor sections are hingedly movable to accommodate a change in angular relationship between the rear wall and the front wall.

2. A trolley as claimed in claim 1, wherein the floor is hingedly connected to the front wall and, the ends of the floor panels or floor sections are supported by guides or supports along the side walls.

3. A trolley as claimed in claim 1, further including a handle at or adjacent a rear of the basket.

4. A trolley as claimed in claim 3, wherein the handle interconnects extensions at the upper rear ends of the side walls and is provided with a shopping bag hanger.

5. A trolley as claimed in claim 1, wherein stops or blocks on the side walls engage, and support, the rear wall and the floor when the trolley is in use.

6. A trolley as claimed in claim 1, wherein the side and front walls are formed of plastics material, being injection moulded with a foam core and/or integral steel or aluminium tubular frame.

7. A trolley as claimed claim 6, wherein the rear wall and floor are of similar construction.

8. A trolley as claimed in claim 1, wherein the side walls are concave in plan view and are inwardly tapered towards the front wall in plan view.

9. A trolley as claimed in claim 1, wherein a pair of rear wheels, which are fixed or steerable, are provided on axles supported on downwardly directed legs or extensions at the rear of the side walls.

10. A trolley as claimed in claim 1, wherein the trolley has a pair of front wheels, or a single steerable front wheel.

11. A shopping trolley basket including:
    a rear wall, inclined to the vertical, operably hinged to two side walls of the basket at or adjacent an upper end of the rear wall; and
    a floor, having a plurality of floor panels or sections hingedly interconnected to each other, extending transversely to the basket, and hingedly connected at a rearward end to the rear wall, the floor being substantially horizontal and downwardly inclined from the rearward end to the forward ends; so arranged that:
    as the trolley provided with the basket is nested with a similar trolley, the rear wall is swung inwardly and upwardly to cause the floor to be swung upwardly to lie behind the front wall, where the floor panels or sections are hingedly movable to accommodate a change in angular relationship between the rear wall and front wall.

12. A basket as claimed in claim 11, where the ends of the floor panels or sections are supported by guides or supports along the side walls.

13. A trolley basket as claimed in claim 11, where a front panel or section of the floor is fixed to the front wall or the side walls.

14. A trolley basket as claimed in claim 11, where a front panel or section of the floor is hingedly connected to the front wall or side walls.

* * * * *